(12) United States Patent
Kikuchi et al.

(10) Patent No.: US 12,533,798 B2
(45) Date of Patent: Jan. 27, 2026

(54) END EFFECTOR, END-EFFECTOR SET, AND CONTROL SYSTEM

(71) Applicant: Panasonic Intellectual Property Management Co., Ltd., Osaka (JP)

(72) Inventors: Takeshi Kikuchi, Osaka (JP); Hideyuki Kouno, Osaka (JP); Yuzuka Isobe, Osaka (JP); Yoshinari Matsuyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 965 days.

(21) Appl. No.: 17/716,540

(22) Filed: Apr. 8, 2022

(65) Prior Publication Data

US 2022/0226989 A1 Jul. 21, 2022

Related U.S. Application Data

(63) Continuation of application No. PCT/JP2020/034844, filed on Sep. 15, 2020.

(30) Foreign Application Priority Data

Oct. 11, 2019 (JP) .................................. 2019-188133

(51) Int. Cl.
*B25J 9/00* (2006.01)
*B25J 9/16* (2006.01)
*B25J 13/08* (2006.01)
*B25J 15/10* (2006.01)
*B25J 15/00* (2006.01)

(52) U.S. Cl.
CPC .............. *B25J 9/1612* (2013.01); *B25J 13/08* (2013.01); *B25J 15/106* (2013.01); *B25J 15/0052* (2013.01)

(58) Field of Classification Search
CPC ........ B25J 9/1612; B25J 13/08; B25J 15/106; B25J 15/0052; B25J 9/22; B25J 19/04
USPC .... 294/213, 86.4, 87.1, 88, 99.1, 100, 119.1
See application file for complete search history.

(56) References Cited

U.S. PATENT DOCUMENTS

| 5,688,013 A * | 11/1997 | Sehrt ....................... B25J 15/106 294/902 |
| 2009/0314112 A1 * | 12/2009 | Melville ................ B25J 15/106 74/144 |

FOREIGN PATENT DOCUMENTS

| JP | 8-503422 | 4/1996 |
| JP | 10-264068 | 10/1998 |
| JP | 2018-144166 | 9/2018 |

OTHER PUBLICATIONS

International Search Report issued Nov. 10, 2020 in corresponding International Application No. PCT/JP2020/034844.

* cited by examiner

*Primary Examiner* — Jacob A Smith
(74) *Attorney, Agent, or Firm* — Wenderoth, Lind & Ponack, L.L.P.

(57) ABSTRACT

An end effector includes a hole plate includes a plurality of holes, a plurality of pins that respectively penetrate the plurality of holes and are hung on the hole plate to be movable upward, and a force applying part that applies an inward force to an outer pin of the plurality of pins.

8 Claims, 14 Drawing Sheets

END EFFECTOR, END-EFFECTOR SET, AND CONTROL SYSTEM

BACKGROUND

1. Technical Field

The present disclosure relates to an end effector, an end-effector set, and a control system.

2. Description of the Related Art

Patent Literature (PTL) 1 describes a robot hand including an attracting part such as an electromagnet that attracts a workpiece and a conforming part including six or more pins that are lowered by their own weight to conform the shape of the workpiece. The robot hand fixes the ascending or descending pins as necessary and fixes the workpiece using a support hook that supports the workpiece from below as necessary when, for example, the workpiece has a large weight.

PTL 1 is Unexamined Japanese Patent Publication No. H10-264068.

SUMMARY

The present disclosure has been devised in view of the above-mentioned conventional situation and has as its object to provide an end effector that can support a target object (for example, a workpiece).

An end effector according to one aspect of the present disclosure includes a hole plate includes a plurality of holes, a plurality of pins which respectively penetrate the plurality of holes and are hung on the hole plate to be movable upward, and a force applying part that applies an inward force to an outer pin of the plurality of pins.

This makes it possible to further move a plurality of pins inwardly by the force applying part while the target object is surrounded by the pins. Moving the pins inwardly in this manner enables the end effector to support a target object (for example, a workpiece).

DETAILED DESCRIPTION

Hereinafter, exemplary embodiments of the present disclosure will be described in detail with reference to the accompanying drawings as appropriate. It is noted that a more detailed description than necessary may be omitted. For example, the detailed description of already well-known matters and overlapping description of substantially the same configurations may be omitted. This is to avoid an unnecessarily redundant description below and to facilitate understanding of a person skilled in the art. Note that the attached drawings and the following description are provided for those skilled in the art to fully understand the present disclosure, and are not intended to limit the subject matter as described in the appended claims.

First Exemplary Embodiment

Figure 1:
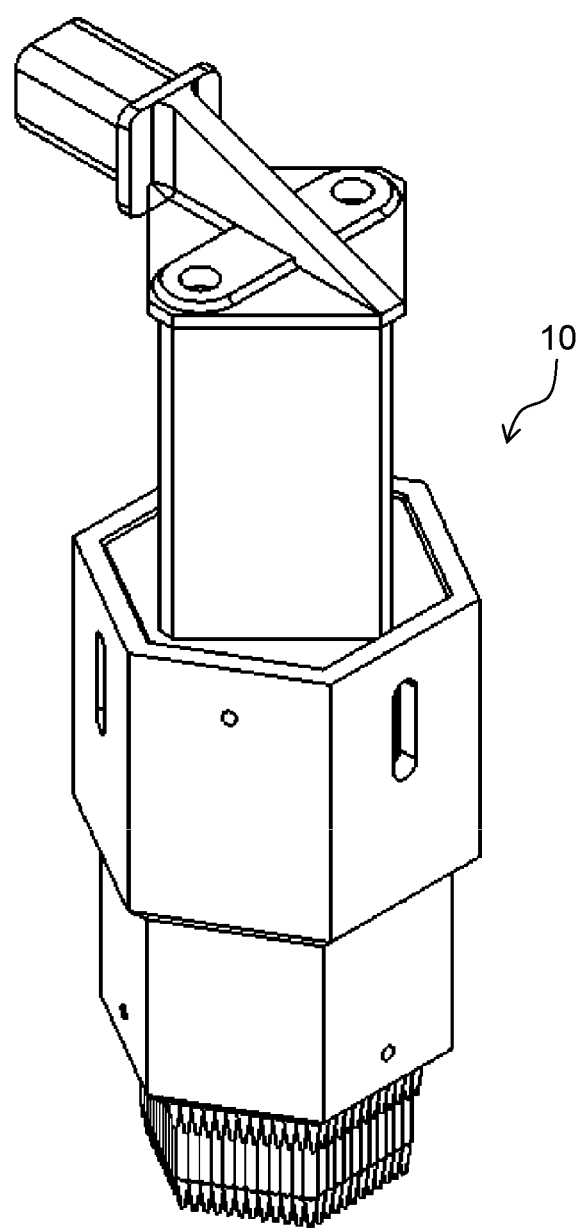
FIG. 1 is a perspective view illustrating an example of a configuration of end effector 10 according to a first exemplary embodiment.

FIG. 1 is a perspective view illustrating an example of a configuration of end effector 10 according to a first exemplary embodiment.

Robot devices used in factories and the like can perform various operations by attaching end effector 10 to a robot arm (not illustrated). For example, the robot arm picks a target object (workpiece or the like) flowing through a production line in a factory using end effector 10 and conveys the object to a destination. With this configuration, even when the pins are usually thin and it is difficult to attach a sensor to each pin itself, the support state of target object 3 can be determined. In addition, the next processing can be automatically started by using the determination itself of whether target object 3 is supported as a trigger. The target object may be a relatively small object such as a screw, a nut, or a washer, or may be a relatively large object (for example, a housing) such as a rib or a boss.

<Standby Stage>

Figure 2:
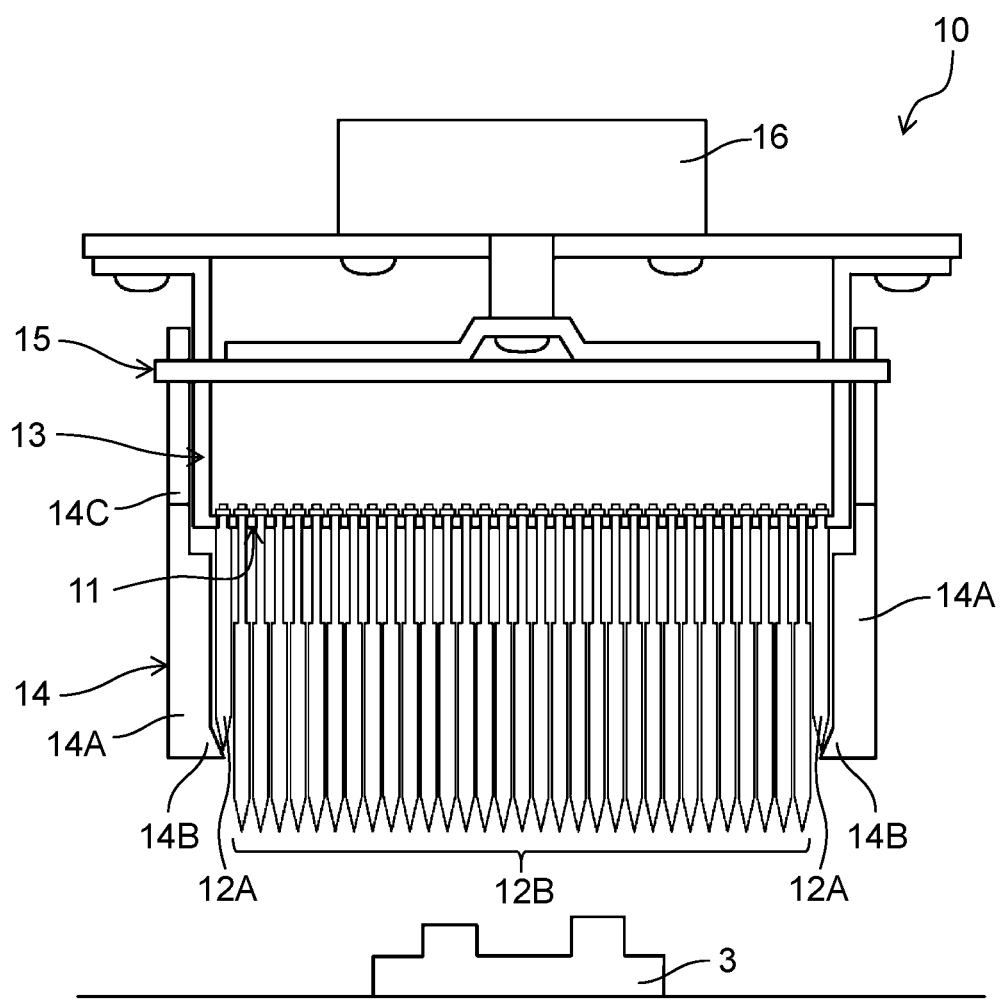
FIG. 2 is a longitudinal sectional view illustrating an example of the configuration of end effector 10 according to the first exemplary embodiment.

FIG. 2 is a longitudinal sectional view illustrating an example of the configuration of end effector 10 according to the first exemplary embodiment. Note that, in the present disclosure, the same direction as gravity will be referred to as downward, and the direction opposite to gravity will be referred to as upward. In the present disclosure, a cross section parallel to the direction of gravity is described as a longitudinal cross section, and a cross section perpendicular to the direction of gravity is described as a transverse cross section.

FIG. 2 illustrates the state of end effector 10 at a stage (hereinafter referred to as a "standby stage") before end effector 10 connected to the robot arm starts picking target object 3. The configuration of end effector 10 will be described below with reference to FIG. 2.

End effector 10 includes hole plate 11, a plurality of pins 12, base 13, holder 14, movable plate 15, and actuator 16.

Hole plate 11 is a plate provided with a plurality of through holes. The thickness of hole plate 11 may be, for example, 0.1 mm to 2 mm. However, the present invention is not limited to this. Hole plate 11 may be integrated with base 13.

Each pin 12 has an elongated rod shape and is inserted into each hole of hole plate 11. The cross-sectional shape of pin 12 and the shape of the hole may be circular, but are not limited to this. The diameter of pin 12 may be, for example, between 0.1 mm and 2 mm, and is slightly smaller than the diameter of the hole. The material of pin 12 may be a metal. However, the material of pin 12 is not limited to metals, and may be, for example, a resin.

Pin 12 has, at its upper end, a head portion having a diameter larger than the diameter of the hole provided in hole plate 11. The head portion serves as a stopper, and pin 12 is hung from hole plate 11 by its own weight. In addition, since the diameter of pin 12 is slightly smaller than the diameter of the hole, pin 12 can move upward when pushed up from below. In this case, the thickness of hole plate 11 is sufficiently short with respect to the length of pin 12. Accordingly, pin 12 is movable within a conical range having the hole as a vertex. That is, pin 12 has some backlash. Accordingly, as will be described later, target object 3 can be supported by pins 12.

The lower portion of pin 12 has a tapered shape that narrows toward the lower end. That is, the lower end of pin 12 has a pointed shape like a needle. Accordingly, as will be described later, this makes it possible to support target objects 3 in various shapes.

The maximum movable radius (for example, the radius of the bottom surface of the cone formed by the movable range having the above hole as a vertex) due to the backlash of pin 12 may be within the distance from the center of pin 12 to the center of adjacent pin 12. This is because the force transmission efficiency decreases when pin 12 moves beyond the center of adjacent pin 12.

Outer pin 12A may be shorter than inner pin 12B. As a result, as will be described later, the force applied inward to outer pin 12A (that is, the force toward target object 3) is transmitted not to the lower end of inner pin 12B but to an appropriate side surface of inner pin 12B, thereby increasing the force for supporting target object 3.

Base 13 has a tubular shape. The upper surface of base 13 is connected to the robot arm. Hole plate 11 is fixed to the lower surface of base 13. Therefore, the plurality of pins 12 hanging from hole plate 11 protrude lower than the lower surface of base 13.

Holder 14 has a tubular shape and surrounds the outside of the plurality of pins 12. Holder 14 includes side surface portion 14A forming a surface substantially parallel to pin 12 and projection 14B protruding toward the inside of the cylinder. In this example, projection 14B is one aspect of the force applying part.

Movable plate 15 is provided above hole plate 11 and can move up and down. Movable plate 15 is coupled to slit 14C provided in an upper portion of side surface portion 14A of holder 14. When movable plate 15 ascends, it comes into contact with the upper end portion of slit 14C. When movable plate 15 further ascends, holder 14 is lifted upward. Further, movable plate 15 pushes down inner pin 12B protruding above hole plate 11 when lowering.

Actuator 16 is a device that raises, lowers, and stops movable plate 15. Actuator 16 may be, for example, an air actuator, and lowers and raises movable plate 15 by sucking and discharging air.

<Tracing Step>

Figure 3:
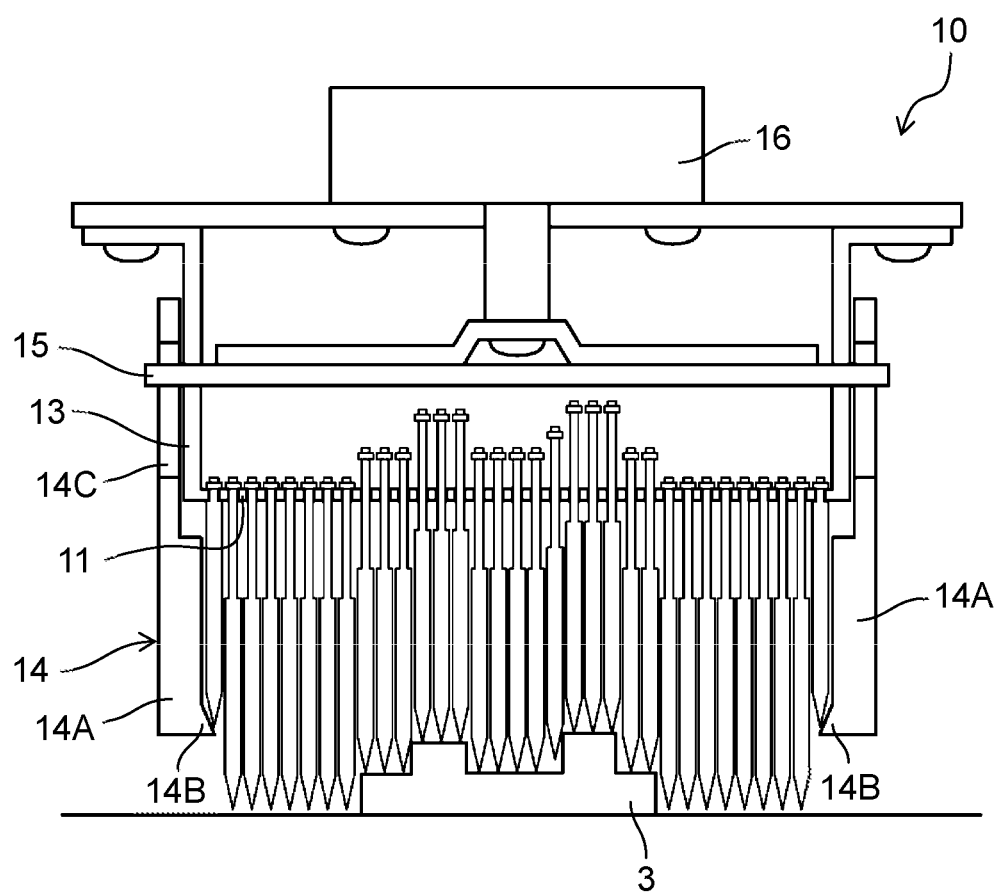
FIG. 3 is a longitudinal sectional view illustrating an example of the configuration of end effector 10 according to the first exemplary embodiment.

FIG. 3 is a longitudinal sectional view illustrating an example of the state of end effector 10 in a tracing stage.

When shifting from the standby stage to the tracing stage, the robot arm lowers end effector 10 toward placed target object 3 and presses the tips of pins 12 against target object 3. That is, the shape of target object 3 is traced by the plurality of pins 12. In this tracing, since pin 12 touching the surface of target object 3 cannot be lowered any more, the upper portion of pin 12 protrudes above hole plate 11. For example, the robot arm lowers end effector 10 until at least some of inner pins 12B among the plurality of inner pins 12B touch the placement surface of target object 3. Thus, end effector 10 can trace the shape of target object 3 by the plurality of inner pins 12B. Note that end effector 10 may be lowered manually or automatically.

Note that end effector 10 may generate vibration in the tracing stage. Since pin 12 that has been caught halfway and has not been completely lowered can be lowered by this vibration, more accurate tracing can be performed. Therefore, in the support stage described later, the transmission efficiency of the force between adjacent pins 12 and the transmission efficiency of the force to target object 3 can be improved.

<Support Stage>

Figure 4:
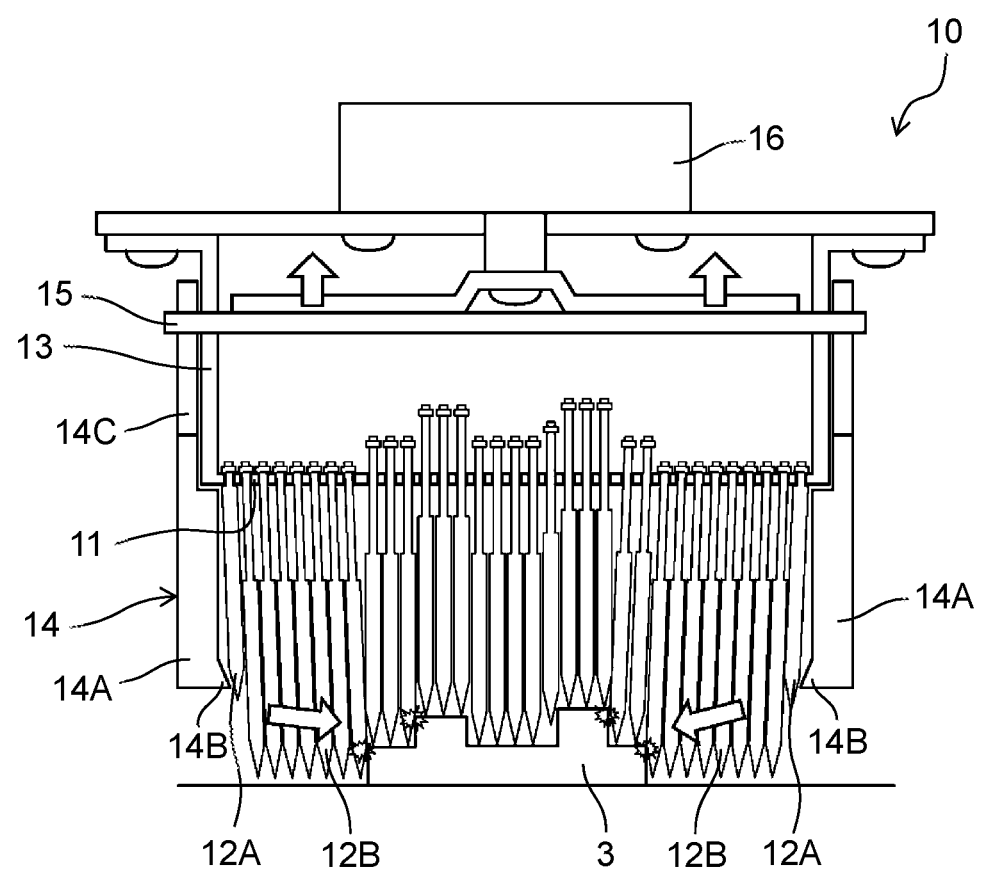
FIG. 4 is a longitudinal sectional view illustrating an example of a state of end effector 10 in a support stage.

FIG. 4 is a longitudinal sectional view illustrating an example of the state of end effector 10 in the support stage.

Upon transition from the tracing stage to the supporting stage, actuator 16 raises movable plate 15 (see the upward arrows from movable plate 15). As a result, holder 14 coupled to movable plate 15 is raised, and projection 14B of holder 14 comes into contact with the side surface of outer pin 12A to apply an inward force to outer pin 12A (that is, a force toward target object 3). Due to this inward force, as outer pin 12A falls inward, inner pin 12B also sequentially falls inward (the rightward arrow on inner pin 12B), and inner pin 12B finally coming into contact with target object 3 is pressed against the side surface of target object 3. In this manner, target object 3 is supported by the plurality of inner pins 12B in contact with target object 3. Note that a mechanism that applies inward force (that is, force toward target object 3) to outer pin 12A by the mechanism as described above is one aspect of the force applying part. For example, projection 14B described above is one aspect of the force applying part. However, the force applying part may be configured by means other than projection 14B.

The robot arm conveys target object 3 to a destination while end effector 10 supports target object 3 in this manner.

Figure 5:
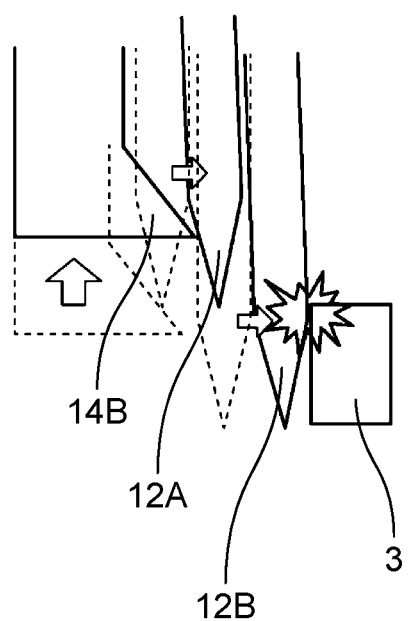
FIG. 5 is an enlarged view of a portion including projection 14B of an example of the configuration of end effector 10.

FIG. 5 is an enlarged view of a portion including projection 14B of an example of the configuration of end effector 10. As illustrated in FIG. 5, when holder 14 is raised, projection 14B comes into contact with outer pin 12A and falls inward. Inner pin 12B falls inward by being pushed by outer pin 12A, and the side surface portion of inner pin 12B comes into contact with target object 3 from the lateral direction illustrated in FIG. 5. That is, a lateral force is applied to target object 3. Applying a force from the opposite side to this lateral force so as to face each other makes it possible to support target object 3 so as to grip target object 3.

Note that the lower portion of pin 12 has a tapered shape that narrows toward the lower end. As a result, as compared with a case where the lower portion of pin 12 has a simple rod shape, the side surface portion of inner pin 12B that has fallen inward comes into contact with target object 3 more smoothly. Therefore, a lateral force is easily applied to target object 3, and the support of target object 3 is stabilized.

<Pushing Stage>

Figure 6:
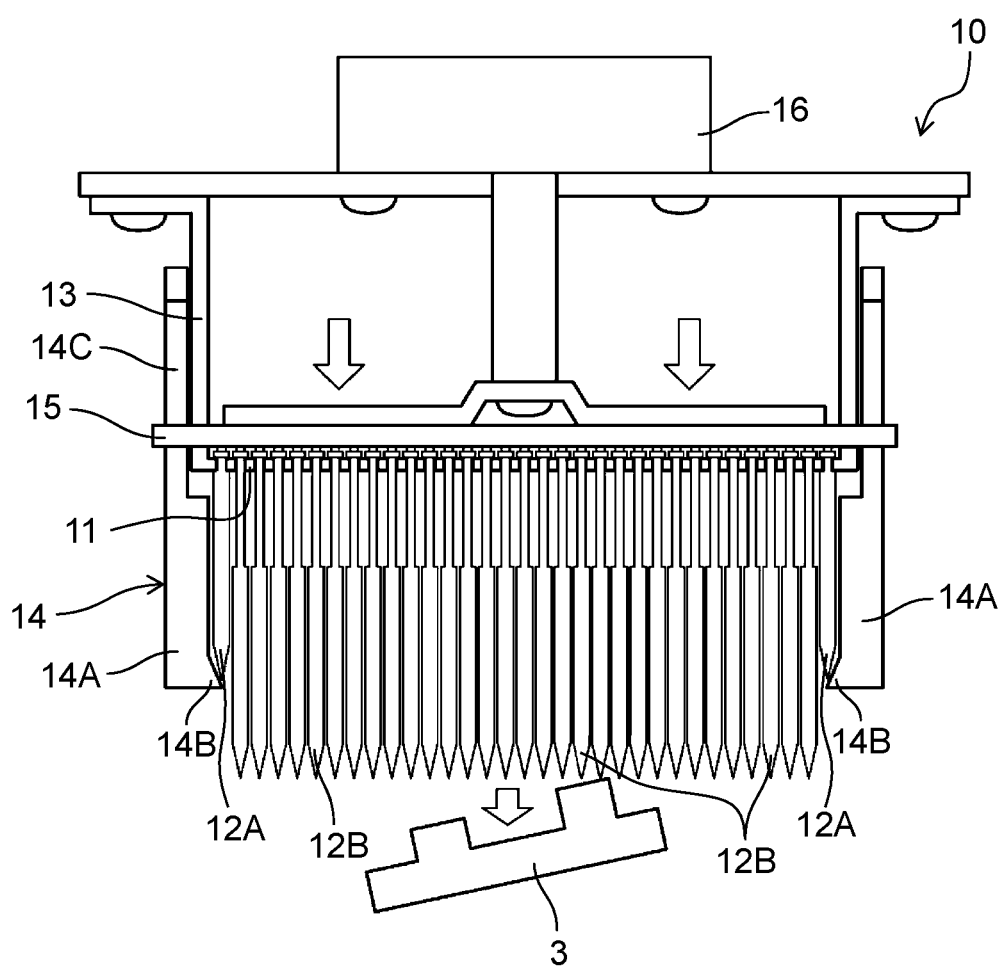
FIG. 6 is a longitudinal sectional view illustrating an example of the state of end effector 10 in a pushing stage.

FIG. 6 is a longitudinal sectional view illustrating an example of the state of end effector 10 in the pushing stage.

Upon transition from the support stage to the pushing stage, actuator 16 lowers movable plate 15 to the lowest point. As a result, holder 14 coupled to movable plate 15 is lowered, and projection 14B of holder 14 does not come into contact with outer pin 12A to release the inward force applied outer pin 12A. Accordingly, since the inward force of inner pin 12B in contact with target object 3 is also released, no lateral force is applied to target object 3. As a result, target object 3 is not supported.

In addition, since inner pins 12B protruding above hole plate 11 are pushed down as movable plate 15 is lowered, target object 3 is pushed downward by inner pins 12B. As a result, target object 3 is pushed out from end effector 10. Pushed target object 3 falls, for example, into a container or the like provided in the next process on the production line.

Figure 7:
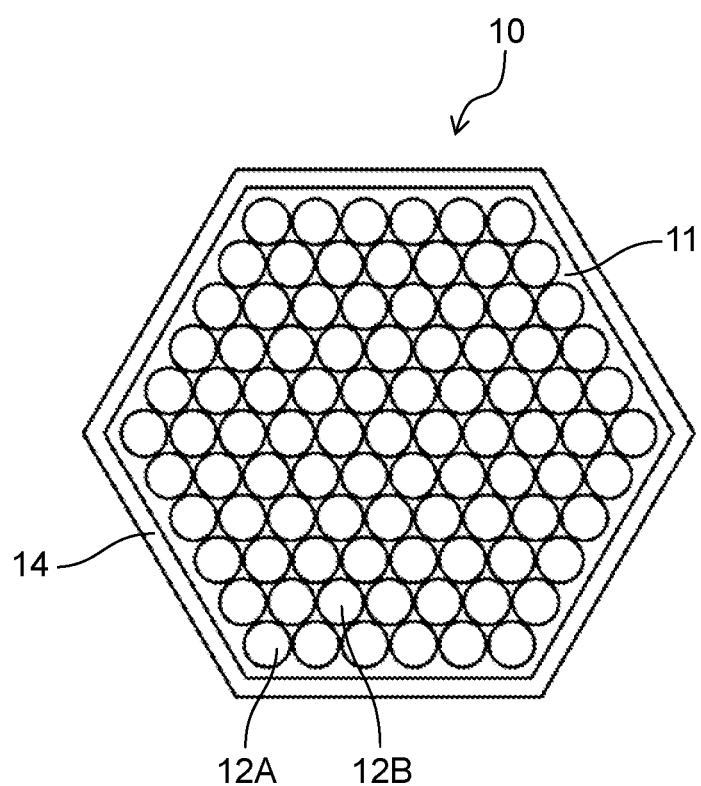
FIG. 7 is a transverse sectional view illustrating an example of the configuration of end effector 10 according to the first exemplary embodiment.

FIG. 7 is a transverse sectional view illustrating an example of the configuration of end effector 10 according to the first exemplary embodiment. The arrangement of the plurality of holes of hole plate 11 is a staggered arrangement. Accordingly, the plurality of pins 12 hanging from hole plate 11 are also arranged in a staggered arrangement as illustrated in FIG. 7. The gap between adjacent pins 12 in the staggered arrangement may be, for example, smaller than the diameter of pin 12.

The staggered arrangement formed by the plurality of holes and the plurality of pins 12 of hole plate 11 forms a plurality of regular hexagons. First, outermost pins 12A among the plurality of pins 12 form the sides of a regular hexagon. Pins 12B on the inner side of outermost pins 12A also form the sides of a regular hexagon. That is, the staggered arrangement is configured such that a plurality of regular hexagons having different sizes overlap each other. By arranging the plurality of pins in this manner, the force applied inward with respect to outer pins 12A (that is, the force toward target object 3) is efficiently transmitted to inner pins 12B, thereby stably supporting target object 3.

The arrangement of the plurality of holes of hole plate 11 and the arrangement of the plurality of pins 12 may be other arrangements. The staggered arrangement formed by the plurality of holes and the plurality of pins 12 of hole plate 11 may form a plurality of regular triangles.

<Configuration of Control System>

Figure 8:
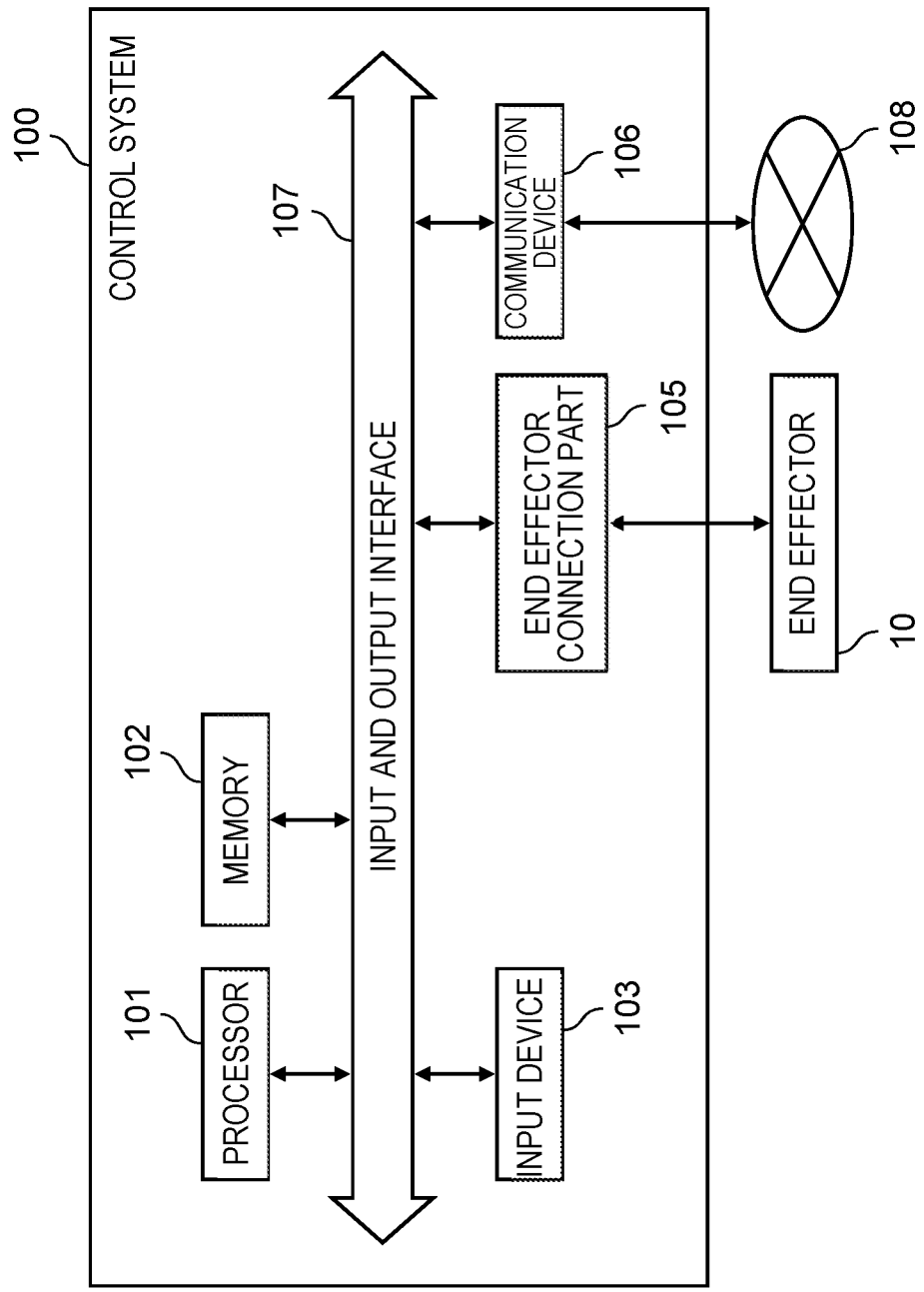
FIG. 8 is a block diagram illustrating an example of a hardware configuration of control system 100 according to the first exemplary embodiment.

FIG. 8 is a block diagram illustrating an example of a hardware configuration of control system 100 according to the first exemplary embodiment. Control system 100 controls the operation of end effector 10 described above. Note that control system 100 may further control a robot arm (not illustrated). Control system 100 may be provided inside the robot arm or may be provided outside the robot arm.

Control system 100 includes processor 101, memory 102, input device 103, end effector connection part 105, communication device 106, and input and output interface 107. Memory 102, input device 103, end effector connection part 105, communication device 106, and input and output interface 107 are each connected to processor 101 by an internal bus or the like so as to be capable of inputting and outputting data or information.

Processor 101 functions as the controller of control system 100. For example, processor 101 performs control processing for comprehensively controlling operation of each part of control system 100, input and output processing of data or information with each part of control system 100, data calculation processing, and data or information storage processing. Processor 101 functions also as a controller that controls end effector 10 and the robot arm. For example, processor 101 controls the operations of end effector 10 and the robot arm in the standby stage, the tracing stage, the support stage, and the pushing stage described above. Processor 101 may be a central processing unit (CPU), a micro processing unit (MPU), a digital signal processor (DSP), or a field programmable gate array (FPGA).

Memory 102 stores various programs (an operating system (OS), application software, etc.) to be executed by processor 101, and various data. Memory 102 includes, for example, a hard disk drive (HDD), a flash memory, a read only memory (ROM), and/or a random access memory (RAM).

Input device 103 has a function as a human interface for a user and receives a manipulation input from the user. In other words, input device 103 is used for giving an input or an instruction for various processes performed by control system 100. An example of input device 103 is a keyboard or a mouse. Alternatively, input device 103 is a programming pendant connected to the controller (not illustrated) of the robot arm.

End effector connection part 105 is a device for connecting end effector 10 to control system 100. End effector connection part 105 and end effector 10 are connected by a wire such as a connector and a cable. However, end effector connection part 105 and end effector 10 may be wirelessly connected.

Communication device 106 is a device for communicating with the outside via network 108. This communication may be wired communication or wireless communication.

Input and output interface 107 has a function as an interface through which data or information is input or output from or to control system 100.

Note that the configuration of control system 100 illustrated in FIG. 8 is an example, and control system 100 may not include some of the components illustrated in FIG. 8 or may further include additional constituent elements not illustrated in FIG. 8.

<Modification>

The configuration of end effector 10 is not limited to the above configuration. For example, projection 14B of holder 14 may be formed of an air tube, and the air tube may be disposed above the lower end of outer pin 12A. In this case, end effector 10 injects air into the air tube in the support stage. As a result, the air tube expanded by the injection of air presses outer pin 12A from the side surface and applies an inward force (that is, a force toward target object 3) to outer pin 12A. Due to this inward force, as outer pin 12A falls inward, inner pin 12B also sequentially falls inward, and inner pin 12B finally coming into contact with target object 3 is pressed against the side surface of target object 3. Even with such a configuration, end effector 10 can support target object 3. The air tube is an aspect of the force applying part.

Alternatively, end effector 10 may be configured not to include holder 14 but to include outer pin 12A made of a shape memory alloy whose tip portion is deformed inward (that is, toward target object 3) when energized. In this case, end effector 10 energizes outer pin 12A in the support stage. Accordingly, as outer pin 12A is deformed inward, inner pin 12B also sequentially falls inward, and inner pin 12B finally coming into contact with target object 3 is pressed against the side surface of target object 3. Even with such a configuration, end effector 10 can support target object 3. A device that energizes outer pin 12A is an aspect of the force applying part.

Second Exemplary Embodiment

A second exemplary embodiment will exemplify end effector 10 that supports a switching adapter. In the above first exemplary embodiment, target object 3 supported by end effector 10 is, for example, a workpiece to be picked in a factory or the like. On the other hand, in the second exemplary embodiment, end effector 10 supports another end effector. As an example of such another end effector, switching adapter 33 described later is available. End effector 10 and the other end effector supported and used by end effector 10 are collectively referred to as a set of end effectors.

The following will describe end effector 10 that supports and uses switching adapter 33 including suction pad 32 capable of sucking target object 3. Note that, in the second exemplary embodiment, constituent elements common to those in the first exemplary embodiment are denoted by common reference numerals, and descriptions thereof may be omitted.

Figure 9:
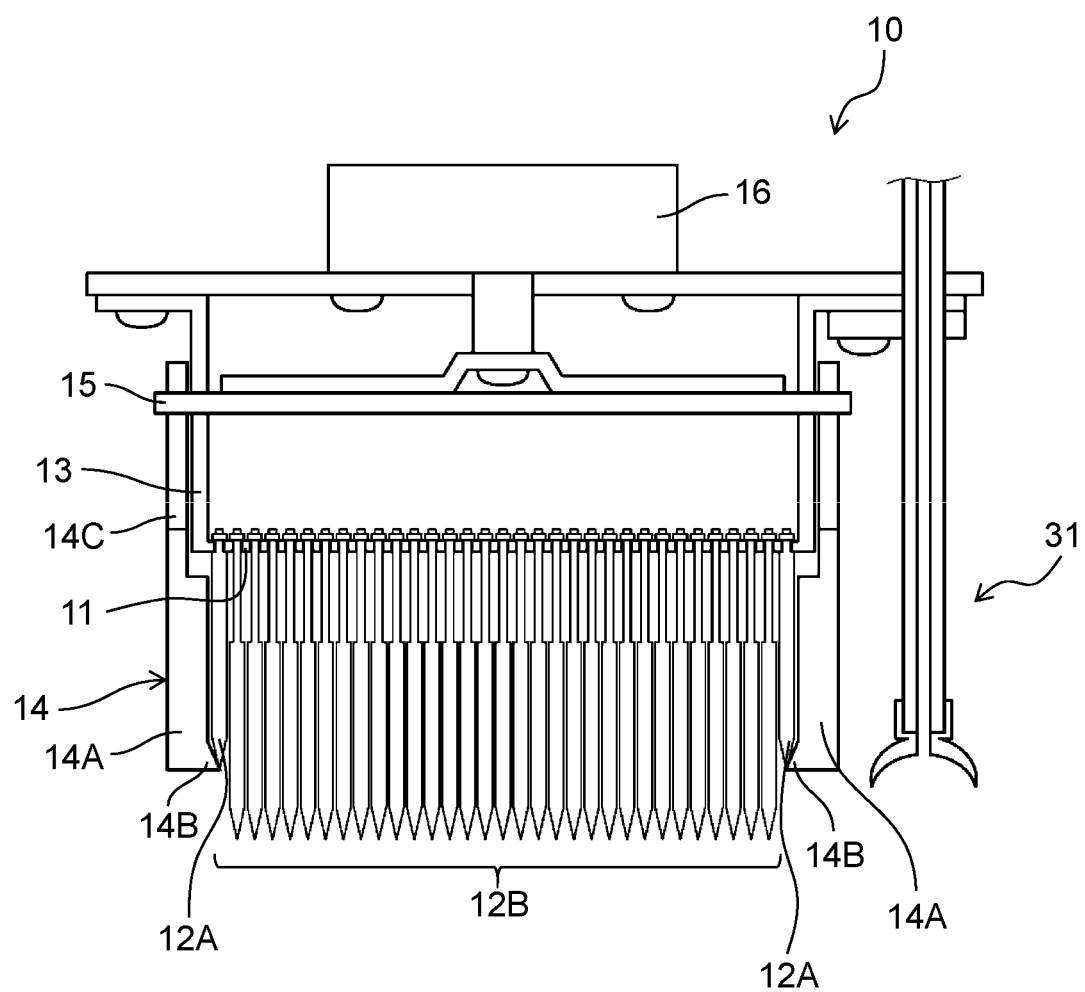
FIG. 9 is a longitudinal sectional view illustrating an example of a configuration of end effector 10 according to a second exemplary embodiment.

FIG. 9 is a longitudinal sectional view illustrating an example of the configuration of end effector 10 according to the second exemplary embodiment.

Main body suction unit 31 is mounted on end effector 10 in addition to the constituent elements described in FIG. 2. Main body suction unit 31 can be coupled to suction pad 32 described with reference to FIG. 10 and constitutes a path for sucking and discharging air with respect to coupled suction pad 32.

When actuator 16 sucks and discharges air, main body suction unit 31 may be connected to an air conveyance system common to actuator 16.

Figure 10:
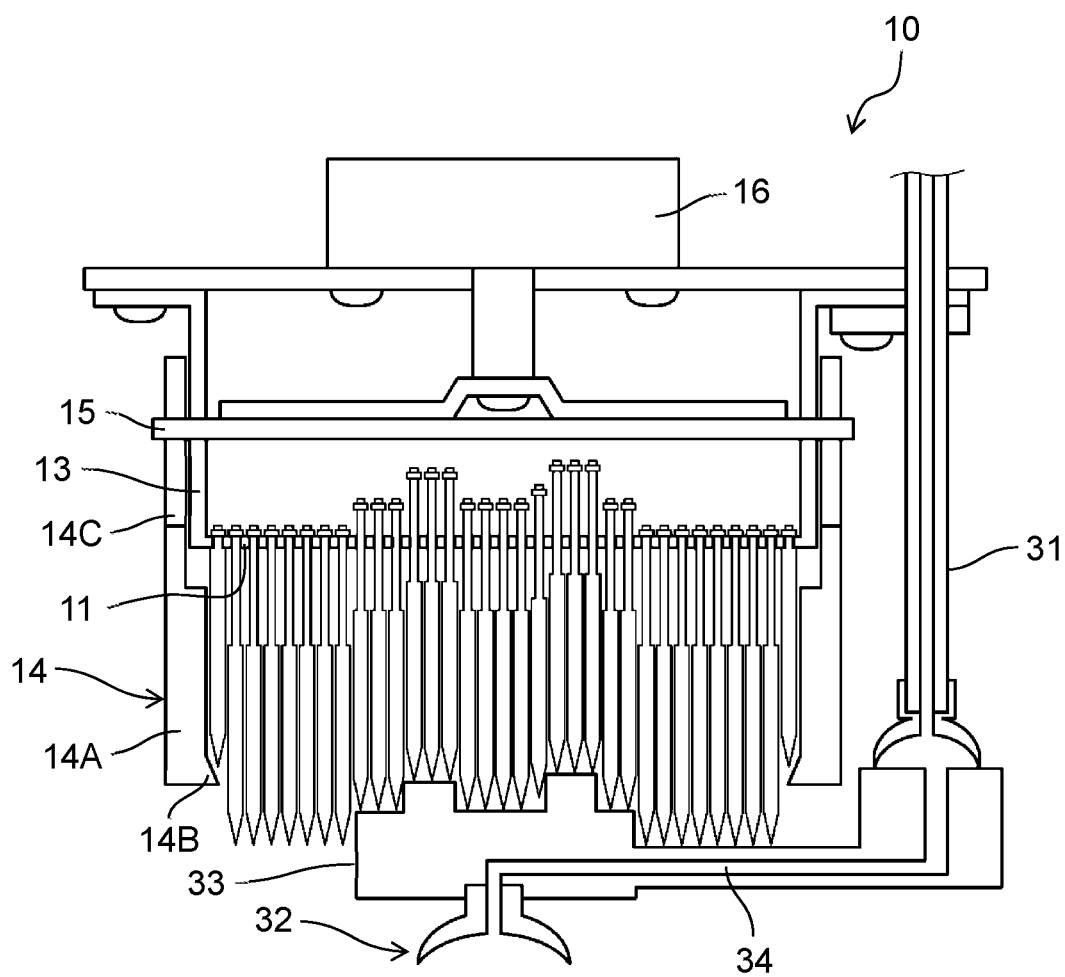
FIG. 10 is a longitudinal sectional view illustrating an example of a tracing stage of switching adapter 33 by end effector 10 according to the second exemplary embodiment.
Figure 11:
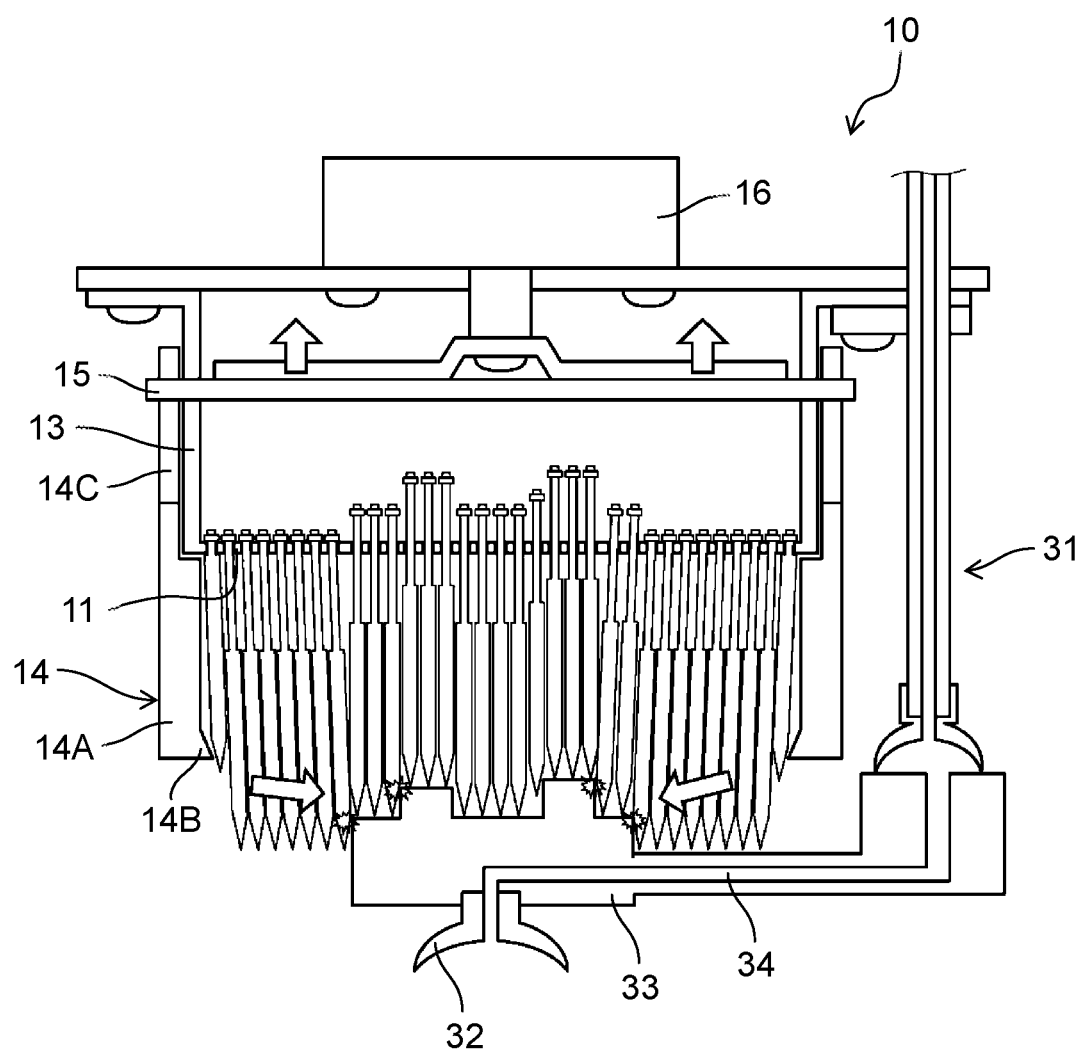
FIG. 11 is a longitudinal sectional view illustrating an example of a support stage of switching adapter 33 by end effector 10 according to the second exemplary embodiment.

FIG. 10 is a longitudinal sectional view illustrating an example of the tracing stage of switching adapter 33 by end effector 10 according to the second exemplary embodiment. FIG. 11 is a longitudinal sectional view illustrating an example of the support stage of switching adapter 33 by end effector 10 according to the second exemplary embodiment.

As illustrated in FIG. 10, switching adapter 33 includes suction pad 32. Pipe 34 for sucking and discharging air into and from the suction pad is coupled to main body suction unit 31. This forms a path for sucking and discharging air from suction pad 32 to main body suction unit 31.

Next, as illustrated in FIG. 10, end effector 10 traces switching adapter 33 in the tracing stage. Next, as illustrated in FIG. 11, end effector 10 supports switching adapter 33 in the support stage.

As a result, end effector 10 can use suction pad 32 through supported switching adapter 33. That is, the robot arm can use another type of end effector such as suction pad 32 through switching adapter 33 without replacing pin-shaped end effector 10 according to the present disclosure.

The other type of end effector mounted on switching adapter 33 is not limited to suction pad 32 described above. For example, a finger type, electromagnetic type, or jamming type end effector may be mounted on switching adapter 33.

Third Exemplary Embodiment

A third exemplary embodiment will exemplify end effector 30 that determines whether or not target object 3 can be supported in the support stage. Note that, in the third exemplary embodiment, constituent elements common to those in the first exemplary embodiment are denoted by common reference numerals, and descriptions thereof may be omitted.

Figure 12:
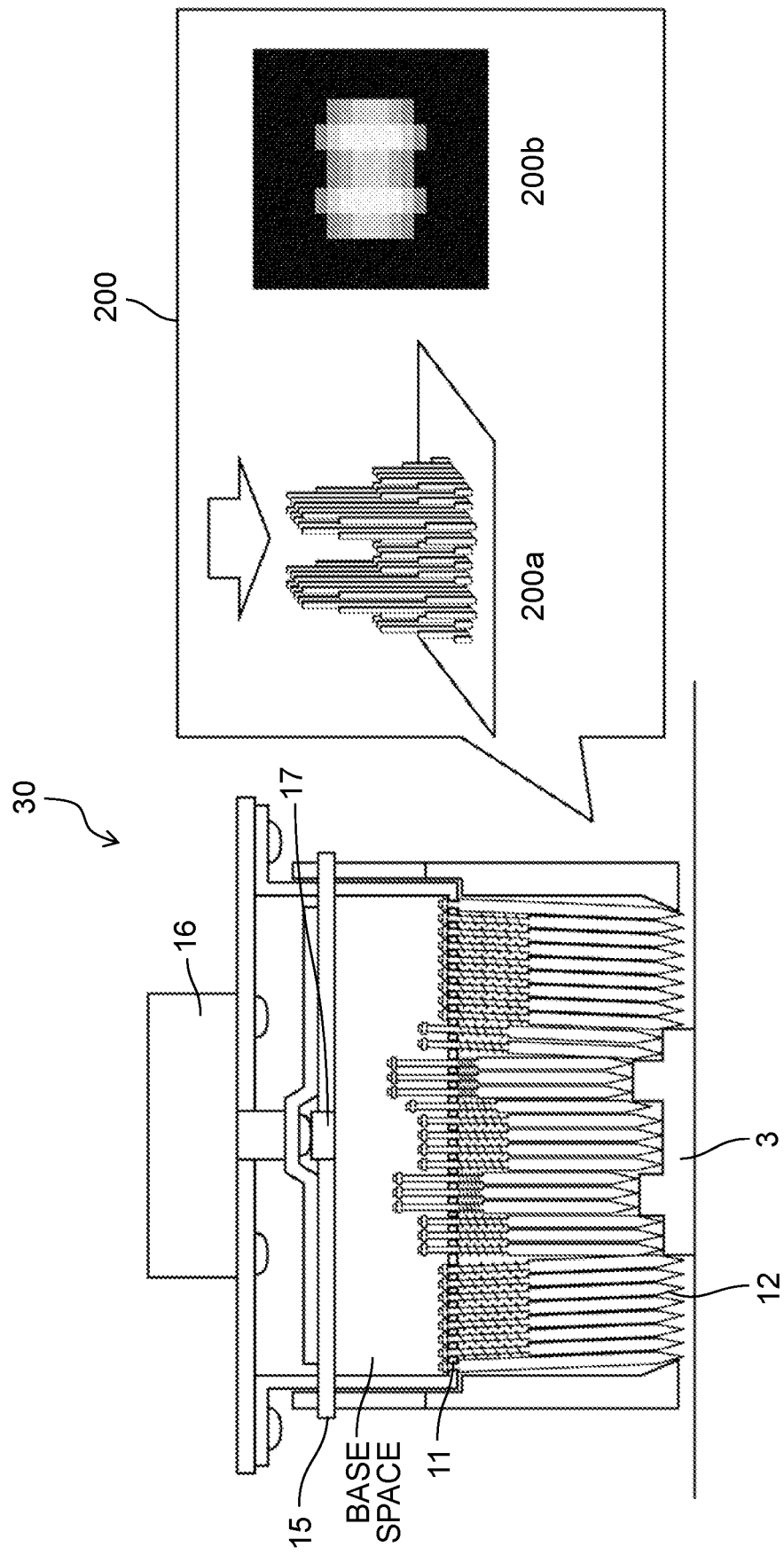
FIG. 12 is a view for explaining a protruding state of pins in a space inside a base in a case where target object 3 according to a third exemplary embodiment can be supported.
Figure 13:
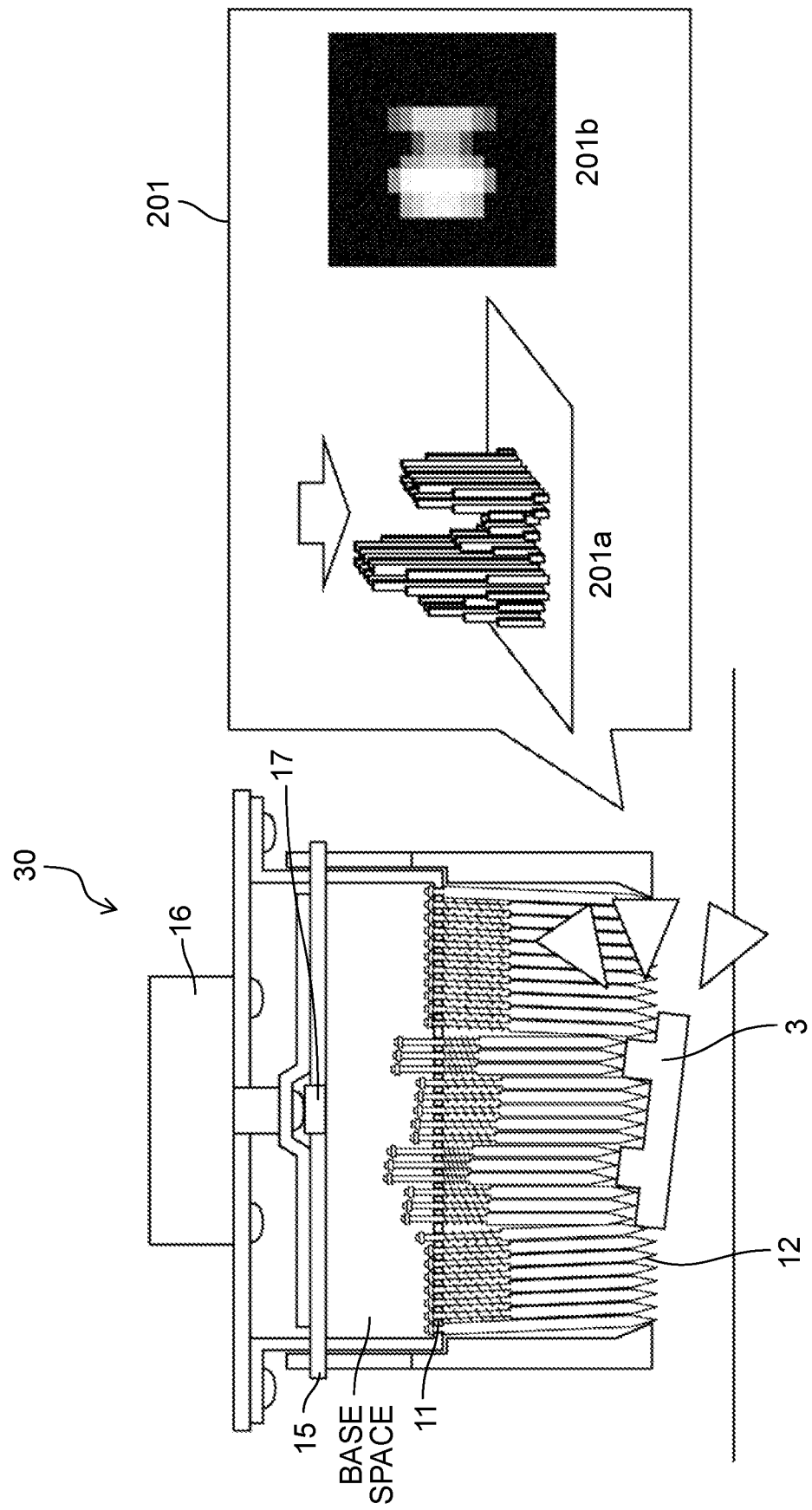
FIG. 13 is a view for explaining the protruding state of pins 12 in the space inside the base in a case where target object 3 according to the third exemplary embodiment cannot be supported.

An example of a method for determining whether or not end effector 30 according to the third exemplary embodiment can support target object 3 in the support stage will be described with reference to FIGS. 12 and 13. FIG. 12 illustrates a state in which pins 12 protrude in the space between hole plate 11 and movable plate 15 (hereinafter referred to as "base inner space") when target object 3 can be supported. FIG. 13 illustrates a state in which pins 12 protrude in the space inside the base when target object 3 cannot be supported.

End effector 30 according to the third exemplary embodiment includes imaging device 17 (for example, a 3D sensor) for imaging the protruding state of pins 12 in the space inside the base in addition to the components of end effector 10 according to the first exemplary embodiment. Note that imaging device 17 may be provided anywhere as long as it can image the space inside the base. In the support stage, for example, as illustrated in FIG. 13, imaging device 17 captures an image of protruding state 201a of pins 12 in the space inside the base to generate three dimensional (3D) sensor image 201b. Processor 101 of control system 130 then specifies three-dimensional shape 201 indicating protruding state 201a of the plurality of pins 12 from 3D sensor image 201b acquired by imaging device 17. Processor 101 compares specified three-dimensional shape 201 with reference three-dimensional shape 200 indicating protruding state 200a of the plurality of pins 12 when target object 3 can be supported as illustrated in FIG. 12 to determine whether or not end effector 30 can support target object 3. In this case, reference three-dimensional shape 200 is identified from 3D sensor image 200b acquired by imaging device 17 by capturing an image of protruding state 200a of the plurality of pins 12 when target object 3 as illustrated in FIG. 12 can be supported. For example, the comparison between three-dimensional shape 201 illustrated in FIG. 13 and reference three-dimensional shape 200 illustrated in FIG. 12 indicates that the right peak of the two peaks is low, and the inclined portion at the right end is missing. That is, the matching degree of three-dimensional shape 201 with respect to reference three-dimensional shape 200 is low (for example, the matching degree is less than a predetermined threshold). Accordingly, processor 101 may determine from three-dimensional shape 201 illustrated in FIG. 13 that target object 3 cannot be supported.

When the height of a peak of three-dimensional shape 201 is less than a predetermined value, processor 101 may determine that target object 3 is not supported. When the inclination angle from the skirt to the peak of three-dimensional shape 201 is less than a predetermined angle (that is, when the inclination from the foot to the peak is gentle), processor 101 may determine that target object 3 is not supported. This is because in these cases, the area of each pin 12 in contact with the side surface of target object 3 is insufficient (for example, the lower end of pin 12 is in contact with target object 3, but the portion above the lower end of pin 12 is not in contact with target object 3), and there is a high possibility that end effector 10 cannot lift target object 3.

With this configuration, even when the pins are usually thin and it is difficult to attach a sensor to each pin itself, the support state of target object 3 can be determined. In addition, the next processing can be automatically started by using the determination itself of whether target object 3 is supported as a trigger. If it is determined that end effector 10 has not been able to support target object 3, it is possible to perform processing such as redoing the tracing stage or the support stage, or notifying of an alert. When it is determined that end effector 30 can support target object 3, target object 3 can also be moved to the next work place.

Figure 14:
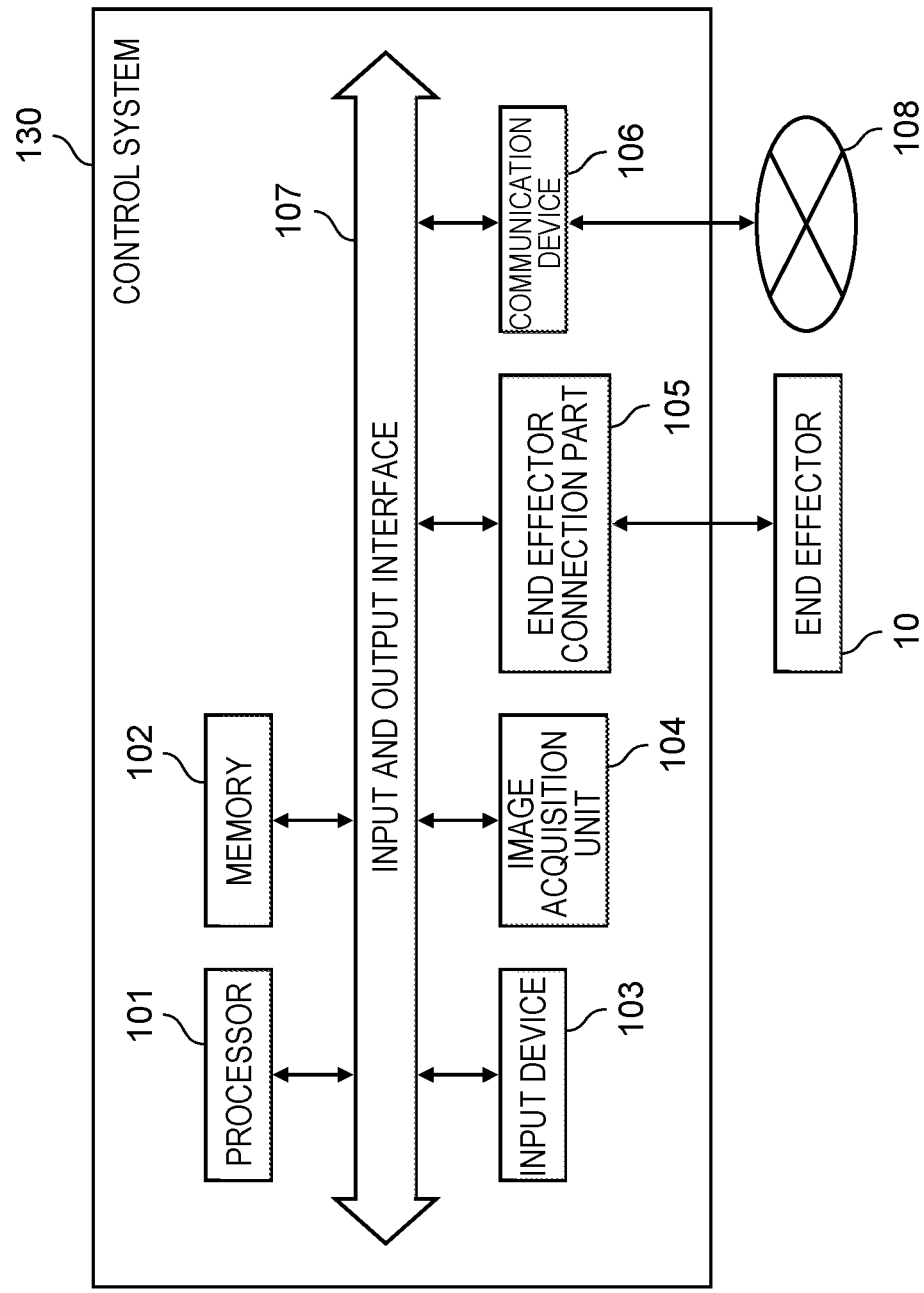
FIG. 14 is a block diagram illustrating an example of a hardware configuration of control system 100 according to the third exemplary embodiment.

FIG. 14 is a block diagram illustrating an example of the hardware configuration of control system 130 according to the third exemplary embodiment. Note that, in the description with reference to FIG. 14, constituent elements common to those in FIG. 8 are denoted by common reference numerals, and descriptions thereof will be omitted.

Control system 130 includes image acquisition unit 104 in addition to the constituent elements illustrated in FIG. 8.

Imaging device 17 described above is connected to image acquisition unit 104 wiredly or wirelessly. Image acquisition unit 104 then acquires an image captured by imaging device 17. Processor 101 performs various types of image processing on the image acquired by image acquisition unit 104. Note that control system 130 may further include an image processing unit (not illustrated), and in this case, the image processing unit may perform various types of image processing under the control of processor 101.

As described above, end effector 10 according to an aspect of the present disclosure includes hole plate 11 provided with the plurality of holes, the plurality of pins 12 which respectively penetrate the plurality of holes and are hung on hole plate 11 so as to be movable upward, and the force applying part (for example, projection 14B) that applies an inward force to outer pin 12A among the plurality of pins 12. As a result, when the force applying part applies an inward force (that is, a force toward target object 3) to outer pins 12A, outer pins 12A fall inward, and accordingly, inner pins 12B sequentially fall inward, and inner pins 12B finally coming into contact with target object 3 can support target object 3.

Further, the arrangement of the plurality of holes is a staggered arrangement and may form a hexagonal shape. As a result, the inward force applied to outer pin 12A is efficiently transmitted by inner pin 12B, so that the force for supporting target object 3 is increased.

The lower portion of pin 12 may have a tapered shape that narrows toward the lower end. This makes it possible to support target objects 3 in various shapes.

End effector 10 may be capable of generating vibration for moving pin 12 downward. Accordingly, since pin 12 that has been caught halfway and has not been completely lowered can be lowered by this vibration, more accurate tracing can be performed. Therefore, in the support stage, the transmission efficiency of the force between adjacent pins 12 and the transmission efficiency of the force to target object 3 can be improved.

In addition, the force applying part is projection 14B, and projection 14B may come into contact with the side surface of outer pin 12A when lifted to apply an inward force. As a result, when raised, projection 14B can apply an inward force to outer pin 12A.

End effector 10 may further include movable plate 15 that is disposed above hole plate 11, raises projection 14B when ascending, and pushes down pin 12 protruding above hole plate 11 and lowers projection 14B when descending. Accordingly, movable plate 15 ascends to support target object 3 and descends to push out target object 3. That is, both the support and the pushing of target object 3 can be achieved by a simple operation such as ascending and descending of movable plate 15.

End effector 10 may further include actuator 16 that raises and lowers movable plate 15. Accordingly, movable plate 15 can be raised and lowered by controlling actuator 16.

The set of end effectors may also include end effector 10 described above and another end effector supportable by end effector 10. This makes it possible to perform work while supporting the other end effector without replacing the end effector.

Furthermore, control system 130 that controls end effector 30 may include a controller (processor 101), and the controller may acquire a 3D sensor image obtained by imaging the plurality of pins 12 protruding above hole plate 11 and determine, on the basis of the 3D sensor image, whether or not the end effector supports the target object. As a result, even in a case in which normal pin 12 is thin and it is difficult to attach a sensor to pin 12 itself, the support state of target object 3 can be determined, and the next processing can be automatically started by using the determination itself as a trigger as to whether or not target object 3 is supported.

The exemplary embodiments have been described above with reference to the accompanying drawings, but the present disclosure is not limited to the above examples. It is obvious that those skilled in the art can conceive various changes, modifications, substitutions, additions, deletions, and equivalents within the scope described in the claims, and it is understood that these also belong to the technical scope of the present disclosure. In addition, the components in the above-mentioned exemplary embodiments may be arbitrarily combined without departing from the spirit of the present invention.

The end effector according to the present disclosure is applicable to an apparatus for supporting an object.

What is claimed is:

1. An end effector comprising:
   a hole plate including a plurality of holes;
   a plurality of pins which respectively penetrate the plurality of holes and are hung on the hole plate to be movable upward; and
   a force applying part that applies an inward force to an outer pin of the plurality of pins,
   wherein the force applying part is a projection, and the projection comes into contact with a side surface of the outer pin to apply the inward force when the projection is raised.

2. The end effector according to claim 1, wherein the plurality of holes are arranged in a staggered arrangement and form a hexagonal shape.

3. The end effector according to claim 1, wherein each of the plurality of pins has a lower portion tapered to be narrowed toward a lower end.

4. The end effector according to claim 1, wherein the end effector is configured to generate vibration for moving the plurality of pins downward.

5. The end effector according to claim 1, further comprising
   a movable plate that is disposed above the hole plate, raises the projection when the movable plate ascends, and pushes down a pin protruding above the hole plate among the plurality of pins and lowers the projection when the movable plate descends.

6. The end effector according to claim 5, further comprising
   an actuator that raises and lowers the movable plate.

7. A set of end effectors comprising:
   the end effector according to claim 1; and
   another end effector configured to be supported by the end effector.

8. A control system that controls the end effector according to claim 1, the control system comprising
a controller that acquires a three dimensional (3D) sensor image obtained by imaging the plurality of pins protruding above the hole plate and determines, based on the 3D sensor image, whether or not the end effector supports the target object.

\* \* \* \* \*